United States Patent [19]
Dauby et al.

[11] 4,041,296
[45] Aug. 9, 1977

[54] HIGH-SPEED DIGITAL MULTIPLY-BY-THREE DEVICE

[75] Inventors: Alain Dauby; Vladimir Riso, both of Nice; Daniel Roger-Rodés, Antibes, all of France

[73] Assignee: International Business Machines Incorp., Armonk, N.Y.

[21] Appl. No.: 637,359

[22] Filed: Dec. 3, 1975

[51] Int. Cl.² ............................................. G06F 7/52
[52] U.S. Cl. .................................................. 235/164
[58] Field of Search ............................... 235/164, 175

[56] References Cited
U.S. PATENT DOCUMENTS

| | | | |
|---|---|---|---|
| 2,879,001 | 3/1959 | Weinberger et al. | 235/175 |
| 2,966,305 | 12/1960 | Rosenberger | 235/175 |
| 3,437,801 | 4/1969 | Wilhelm, Jr. | 235/175 |
| 3,691,359 | 9/1972 | Dell et al. | 235/164 |
| 3,919,535 | 11/1975 | Vattuone | 235/164 |

OTHER PUBLICATIONS

R. K. Richards, *Arithmetic Operations in Digital Computers* D. Van Nostrand Co., Inc. 1955 pp. 113–114.
R. L. Haven "Multiplying Circuit" Western Electric Technical Digest No. 26, Apr. 1972 pp. 37–38.

*Primary Examiner*—David H. Malzahn
*Attorney, Agent, or Firm*—Harry T. Berriman

[57] ABSTRACT

High speed digital multiply-by-three device comprising a sum generation unit associated with a carry look-ahead unit, the latter comprising means for generating the carry bit $C_{k-1}$ to be fed to the $(k+1)^{th}$ stage of said sum generation unit by performing the logic function $$C_{k-1} = X_k X_{k-1} + (X_{k-1} X_{k-2} + \ldots + X_k X_{k-1} X_{k-2} + \ldots + X_k X_{k-1} X_{k-2} \ldots X_1) + (X_k X_{k-1} X_{k-2} + \ldots + X_k X_{k-1} X_{k-2} \ldots X_0)$$

3 Claims, 6 Drawing Figures

HIGH-SPEED DIGITAL MULTIPLY-BY-THREE DEVICE

BACKGROUND OF THE INVENTION

This invention relates to a high-speed digital device for multiplying any binary number by three.

In many computing devices, and particularly in digital multiplier devices, it is often necessary to multiply a given number x by three. One of the more attractive prior art methods of performing multiplications consists in dividing the multiplier term into groups of bits of constant length and in analyzing such groups to determine a multiple of the multiplicand to be used in order to carry out the desired multiplication as a sequence of accumulations. Once this multiple has been determined, means for generating same must of course be provided.

More specifically, let us assume that, in a multiplication XY to be performed, the multiplier Y is divided into several groups of three bits each, beginning with the lowest-order bit, plus one of the bits of the preceding group. For example, if $$Y = 1\ 0\ 0\ 1\ 1\ 0\ 1\ 0\ 1$$

$$\underset{g\,1}{1\ 0\ 1\ 0}$$

$$\underset{g\,2}{1\ 1\ 0\ 1}$$

$$\underset{g\,3}{1\ 0\ 0\ 1}$$

$$\underset{g\,4}{0\ 0\ 0\ 1}$$

Groups $g1$, $g2$, $g3$ and $g4$ are successively analyzed. To each configuration of a group g corresponds a contribution which is a multiple of X to be added to the contributions of the previous groups to finally provide, after group $g4$ has been processed, the desired product of XY. The following table summarizes the contributions associated with the various configurations of g.

| g | Bit of preceding g | Multiple of X |
|---|---|---|
| 000 | 0 | 0 |
| 000 | 1 | +X |
| 001 | 0 | +X |
| 001 | 1 | +2X |
| 010 | 0 | +2X |
| 010 | 1 | +3X |
| 011 | 0 | +3X |
| 011 | 1 | +4X |
| 100 | 0 | −4X |
| 100 | 1 | −3X |
| 101 | 0 | −3X |
| 101 | 1 | −2X |
| 110 | 0 | −2X |
| 110 | 1 | −X |
| 111 | 0 | −X |
| 111 | 1 | 0 |

The above method makes it possible to find a compromise between the number of adders required to build the multiplier device and the speed of the latter. However, it will be seen that the speed of the device is dependent, in particular, upon the time required to determine the multiples of X. This is especially troublesome where the device must perform successive multiplications XY, X'Y', X"Y", etc., at a rate which should be as fast as possible and in any event faster than that at which the operands X, Y, X', Y', etc., are received. In such cases, the so-called pipelining technique is sometimes used. That is, as soon as group $g1$ of Y has been processed, the associated circuits start processing group $g1$ of Y', thereby initiating the computation of X'Y', then of X"Y", etc., before the computation of XY is completed. It is clear, therefore, that a device capable of generating the multiples of terms X, X',X",etc., as quickly as possible would be quite useful. Multiples such as X, 2X, 4X, that is, multiples belonging to the family $2^N X$, can readily be generated from X. All that is required to do so is to shift X N bit positions toward the higher-order positions. However, this does not apply when 3X or one of its multiples is required.

In a prior art device designed to multiply binary numbers by means of analyses of the groups of bits g that comprise the multiplier, 3X is obtained by adding X to 2X in two successive operations. Two basic cycles of operation instead of one are therefore required. Such a process is too slow and does not permit maintaining an operating cycle of constant duration regardless of the configuration of the groups of bits.

Alternatively, 3X can be generated using an additional device. In that case, the additional device should be inexpensive and capable of operating at high speed.

Accordingly, it is an object of the present invention to provide a high-speed device for multiplying any binary number X by three.

Another object of the invention is to implement such a device using a limited number of circuits, thereby reducing the size of the device.

The foregoing and other objects, features and advantages of the invention will be apparent from the following more particular description of preferred embodiments of the invention, as illustrated in the accompanying drawings.

THE DRAWINGS

DETAILED DESCRIPTION OF THE INVENTION

Figure 1:
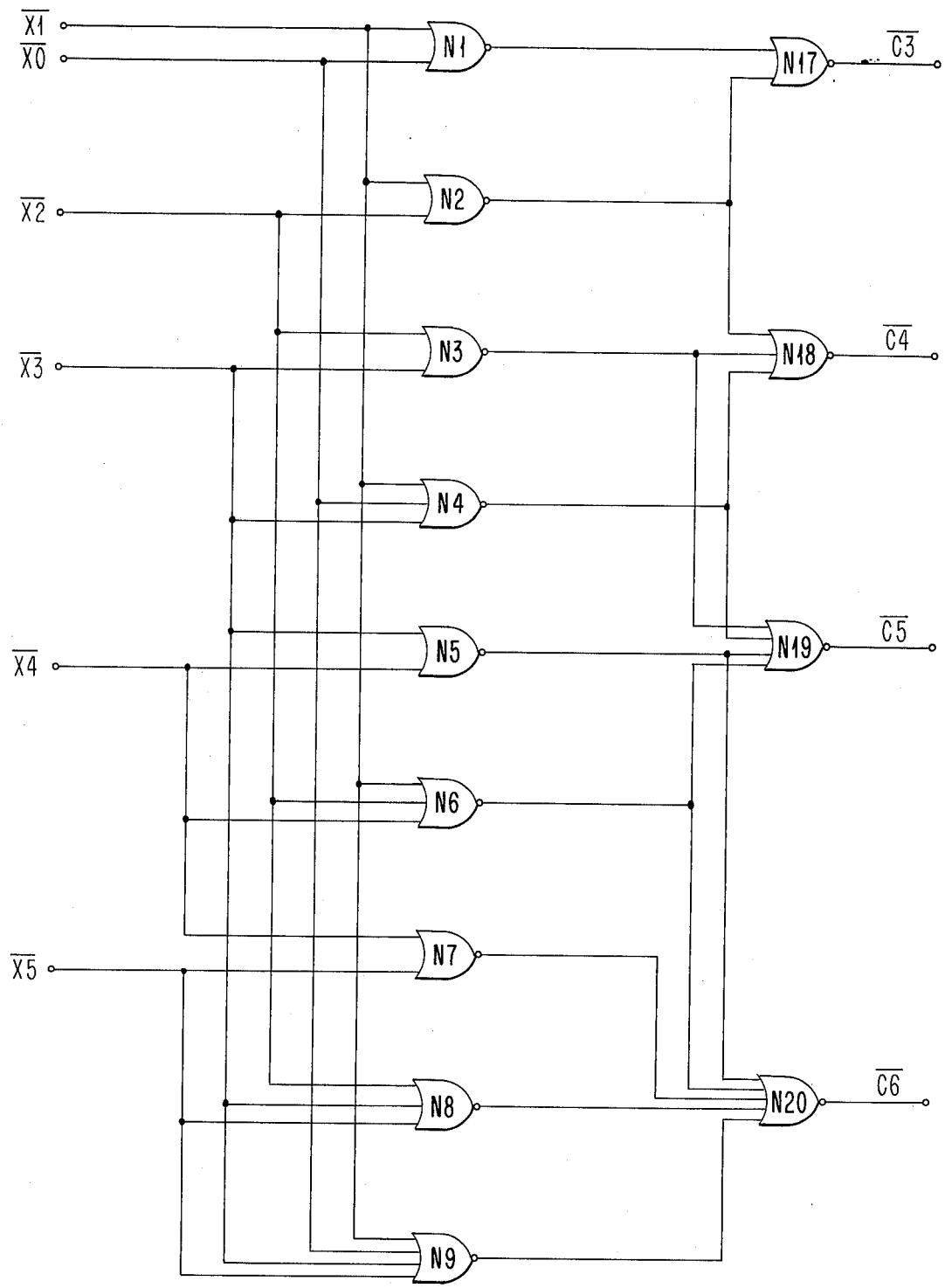
FIGS. 1 and 1A represent an implementation of the carry look-ahead unit of the present invention.

The multiplier device of the present invention provides 3X by adding X to 2X in accordance with the well-known carry look-ahead technique, but is characterized in that it includes a carry look-ahead unit that feeds the inputs of a sum generation unit, with the carry look-ahead unit providing the carry bit intended for the stage of order $(k+1)$ of the sum generation unit by means of the following logic combinations of the bits of X:

$$X_k.X_{k-1} + (X_{k-1}.X_{k-2} + \ldots + X_{k-1}.X_{k-3}.X_{k-5}\ldots X_1) + (X_k.X_{k-2}.X_{K-3} + \ldots + X_k.X_{k-2}.X_{k-4}\ldots X_0)$$

An adder comprising a basic carry look-ahead unit and a basic sum generation unit is described in an article entitled "High-Speed Arithmetic in Binary Computers" by O.L. McSorley in "Proceedings of the IRE," January 1961. The carry look-ahead unit, by logically combining the bits of the words to be added together, supplies a carry bit to each stage of the sum generation unit. This arrangement could be used to generate the multiple of X being sought here, but would require the provision of an excessive number of circuits for the carry look-ahead unit.

The present invention enables a simple carry generator to be realized. If the bits of X are designated $X_0, X_1, \ldots, X_k$, the carry bits, $C_0, C_1, \ldots, C_k$, and the sum bits, $S_0, \ldots, S_k$, and if the so-called two's complement code is used and if $X_n$ is assumed to be the sign bit order, the addition $X+2X$ can be written:

| Order | n+2 | n+1 | n | n−1 | ... | k | ... | 1 | 0 |
|---|---|---|---|---|---|---|---|---|---|
| Carries | | $C_{n+1}$ | $C_n$ | $C_{n-1}$ | ... | $C_k$ | ... | $C_1$ | $C_0$ |
| X | | $X_{n+1}$ | $X_n$ | $X_{n-1}$ | ... | $X_k$ | ... | $X_1$ | $X_0$ |
| 2X | | $X_n$ | $X_{n-1}$ | $X_{n-2}$ | ... | $X_{k-1}$ | ... | $X_0$ | . |
| Sums | $S_{n+2}$ | $S_{n+1}$ | $S_n$ | $S_{n-1}$ | ... | $S_k$ | ... | $S_1$ | $S_0$ |

The only possible combinations of $X_k$ and $X_{k-1}$ are:

| $X_k$ | $X_{k-1}$ |
|---|---|
| 0 | 0 |
| 0 | 1 |
| 1 | 0 |
| 1 | 1 |

In the first case, no carry bit $C_{k-1}$ intended for column "k+1" of the above table can be generated in column $k$ regardless of the value of $C_k$ since $X_k=0$ and $X_{k-1}=0$.

In the second case ($X_k=0$ and $X_{k-1}=1$), the generation of a carry bit depends on the value of $C_k$. Thus, $C_{k+1}=1$ where a carry bit is generated in column "k−1" or any of the preceding columns. This is summarized by the formula $$C_{k+1} = X_{k-1}.X_{k-2} + X_{k-1}.X_{k-3}.X_{k-4} + \ldots + X_{k-1}.X_{k-3}.X_{k-5} \ldots X_1 \quad (1)$$

In the third case ($X_k=1$ and $X_{k-1}=0$), a carry bit for column "k+1" is generated if a carry bit has been generated in columns "k−2" and "k−3" or any of the preceding columns. Thus, $$C_{k+1} = X_k.X_{k-2}.X_{k-3} + \ldots + X_k.X_{k-2}.X_{k-4} \ldots X_0 \quad (2)$$

Lastly, in the fourth case ($X_k=1$ and $X_{k-1}=1$), a carry bit is always generated, so that $$C_{k+1} = X_k.X_{k-1}. \quad (3)$$

Formulas (1), (2) and (3) show that all cases where a carry bit intended for column "k+1" is generated are derived from the general logic formula $$C_{k+1} = X_k.X_{k-1}.X_{k-2} + X_{k-1}.X_{k-3}.X_{k-4} + \ldots + X_{k-1}.X_{k-3}.X_{k-5} \ldots X_1) + (X_k.X_{k-2}.X_{k-3} + \ldots + X_k.X_{k-2}.X_{k-4} \ldots X_0) \quad (4)$$

The carry generator of the multiplier device of the present invention can be implemented in various manners depending upon the technology the designer proposes to utilize, but is in no way restricted to the use of a particular technology. It must only be such as to satisfy formula (4) or any equivalent logic formula while allowing the size of the multiplier device and the power consumption to be minimized.

Figure 1A:
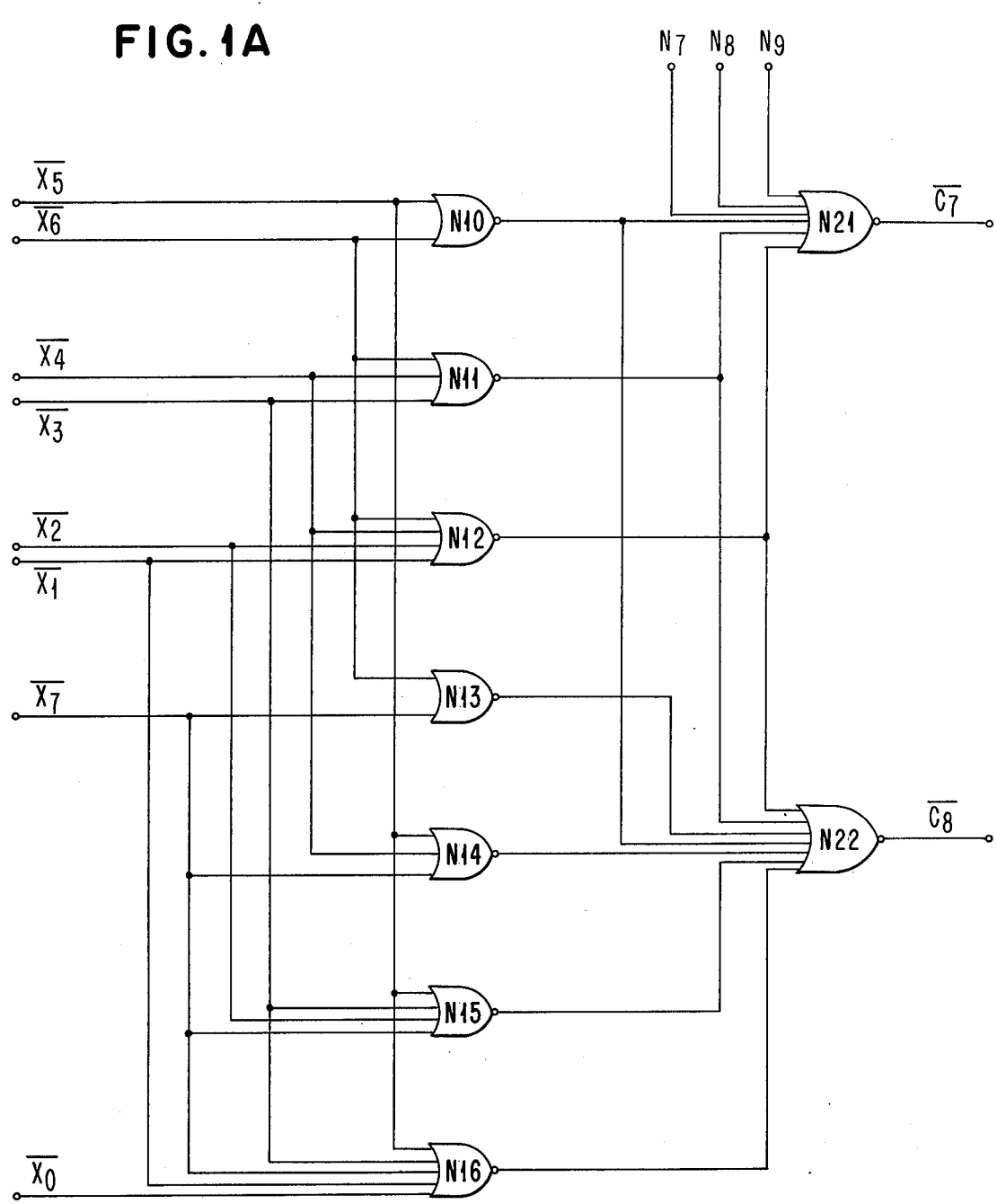

FIGS. 1 and 1A illustrate a carry generator implemented, in accordance with the invention, with NOR circuits for an 8-bit work X written $X_7 \ldots X_3X_2X_1X_0$. The generator includes a first stage comprising 16 NOR circuits N1–N16, and a second stage comprising six NOR circuits N17–N22. The inputs of these NOR circuits are connected to the points shown in the following table:

| Circuit | Inputs of* | Outputs of |
|---|---|---|
| N1 | X0, X1 | |
| N2 | X1, X2 | |
| N3 | X2, X3 | |
| N4 | X0, X1, X3 | |
| N5 | X3, X4 | |
| N6 | X1, X2, X4 | |
| N7 | X4, X5 | |
| N8 | X2, X3, X5 | |
| N9 | X0, X1, X3, X5 | |
| N10 | X5, X6 | |
| N11 | X3, X4, X6 | |
| N12 | X1, X2, X4, X6 | |
| N13 | X6, X7 | |
| N14 | X4, X5, X7 | |
| N15 | X2, X3, X5, X7 | |
| N16 | X0, X1, X3, X5, X7 | |
| N17 | | N1, N2 |
| N18 | | N2, N3, N4 |
| N19 | | N3, N4, N5, N6 |
| N20 | | N5, N6, N7, N8, N9 |
| N21 | | N7, N8, N9, N10, N11, N12 |
| N22 | | N10, N11, N12, N13, N14, N15, N16 |

*the bars above the X's mean that the inverted logic values of X bits are used ($\overline{1} = 0, \overline{0} = 1$)

The outputs from the NOR circuits of the second stage provide the inverted values of the desired carry bits, i.e., C3, C4, C5, C6, C7 and C8. The other bits are obtained more simply since C0=0, C1=0 and C2=X1.X0.

Figure 2:
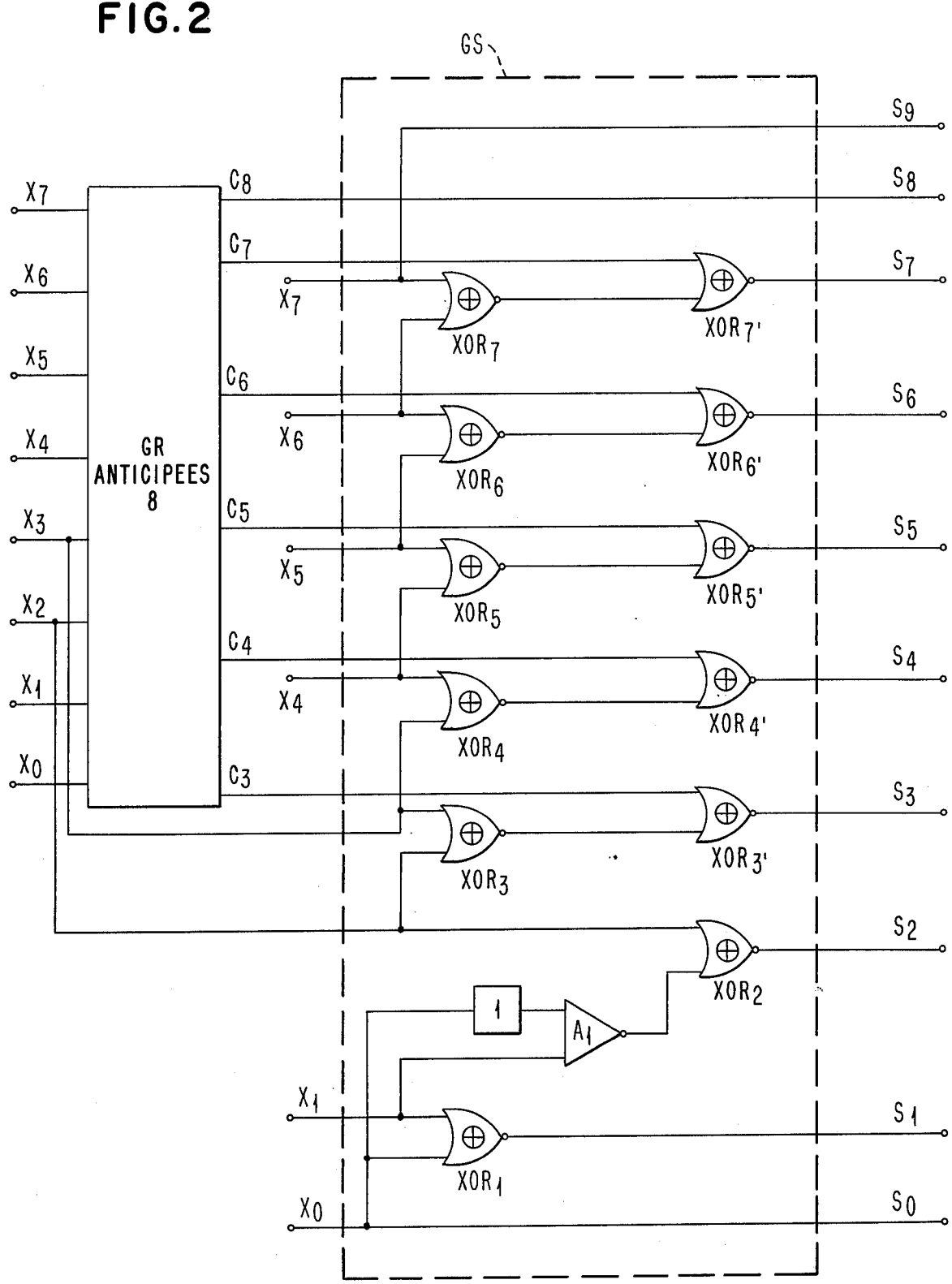
FIG. 2 illustrates an implementation of the multiplier device of the invention.

Accordingly, the multiplier device of the invention can be implemented in accordance with the diagram of FIG. 2. This device includes a carry generator (GR) which is similar to that of FIG. 1 and provides carry bits C3–C8 to a sum generator (GS). Where the arrangement of FIG. 1 is used to determine the carry bits, bit inverters are required for the inputs and the outputs of generator GR. The sum generator supplies SO=XO directly. Bit S1 is obtained by means of an Exclusive OR Invert circuit XOR1 the inputs of which receive X1 and X0. Bit S2 is supplied by an Exclusive OR Invert circuit XOR2 which receives X2 and the output of an AND circuit A1, which itself receives X0, as inverted by an inverter 1, and X1. Bits S3–S7 are respectively provided by a pair of Exclusive OR Invert circuits XOR3, XOR3' – XOR7, XOR7'. If we call XORp and XORp' the pair of order p, we may say that the inputs of XORp receive Xp and $X_{p-1}$ while the inputs of XORp' receive the carry bit Cp and output from XORp. The bit Sp is obtained at the output of XORp'. If X7 is the sign bit S8 is directly obtained from C8 and bit S9 is directly provided by X7. It will be appreciated that if X7 were not the sign bit S8 would be obtained from X7 exclusive OR C8 and S9 would be X7.C8.

The outputs from the NOR circuits of the second stage provide the inverted values of the desired carry bits, i.e., C3, C4, C5, C6, C7 and C8. The other bits are obtained more simply since C0=0, C1=0 and C2=X1.X0.

Accordingly, the multiplier device of the invention can be implemented in accordance with the diagram of FIG. 2. This device includes a carry generator (GR) which is similar to that of FIG. 1 and provides carry bits C3-C8 to a sum generator (GS). Where the arrangement of FIG. 1 is used to determine the carry bits, bit inverters are required for the inputs and the outputs of generator GR. The sum generator supplies S0=X0 directly. Bit S1 is obtained by means of an Exclusive OR Invert circuit XOR1 the inputs of which receive X1 and X0. Bit S2 is supplied by an Exclusive OR Invert circuit XOR2 which receives X2 and the output of an AND circuit A1, which itself receives X0, as inverted by an inverter 1, and X1. Bits S3-S7 are respectively provided by a pair of Exclusive OR Invert circuits XOR3, XOR3' - XOR7, XOR7'. If we call XOR$p$ and XOR$p'$ the pair of order $p$, we may say that the inputs of XOR$p$ receive X$p$ and X$_{p-1}$ while the inputs of XOR$p'$ receive the carry bit C$p$ and output from XOR$p$. The bit S$p$ is obtained at the output of XOR$p'$. If X7 is the sign bit S8 is directly obtained from C8 and bit S9 is directly provided by X7. It will be appreciated that if X7 were not the sign bit S8 would be obtained from X7 exclusive OR C8 and S9 would be X7·C8.

Figure 3:
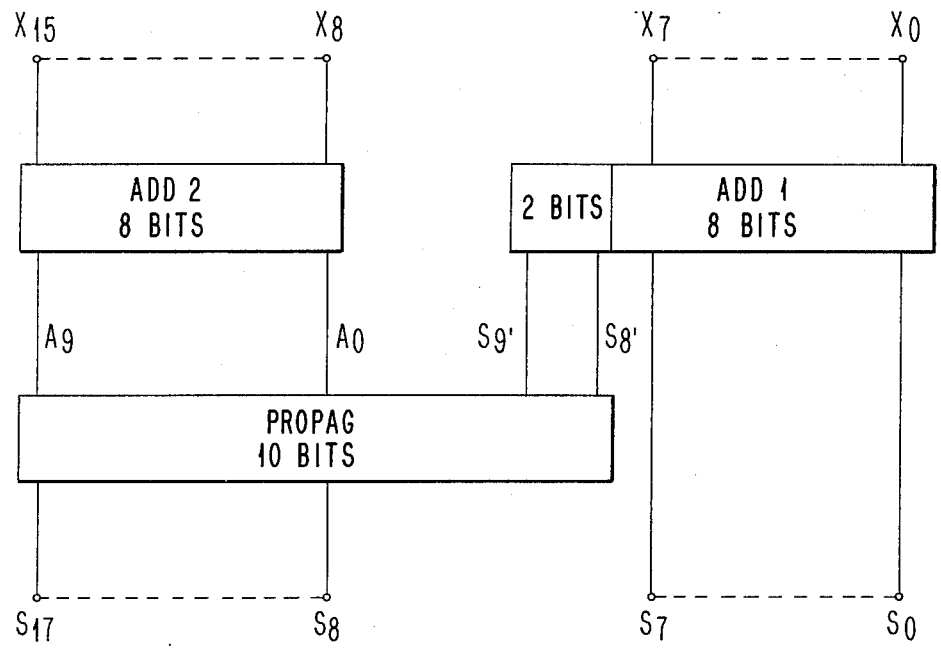
FIG. 3 is an implementation of another multiplier device realized in accordance with the invention.

This architecture of the proposed multiplier device is valid regardless of the number of bits of X but does not necessarily represent the best solution considering the size of the integrated circuit that would be required to implement it. An alternative solution would consist in dividing the adder that performs the operation X+2X into a number of sub-adders. FIG. 3 illustrates a means for processing a 16-bit word X as two words of eight bits each. The lower-order bits ($2^0$ to $2^7$) are processed in a first adder ADD1 and the higher-order bits ($2^8$ to $2^{15}$) in a second adder ADD2. Both of these adders use the technique described earlier and are identical with the adder of FIG. 2 except that in ADD1 X7 is not the sign bit so that, as mentioned previously, S8 would be provided by X7 exclusive OR C8 and S9 would be X7·C8. ADD1 provides bits S0-S7 of the result as well as two bits of weights $2^8$ and $2^9$ which will be added to the two lowest-order bits supplied by ADD2. Bits $2^8$ and $2^9$ may be regarded as carries which must be allowed to propagate through the bits of ADD2. A circuit designated PROPAG is provided for this purpose. Assuming that the sum bits supplied by ADD2 are designated A0-A9, the PROPAG circuit must in effect add bits S8'-S9' of ADD1 to the word comprised of bits A0-A9 to finally provide bits S8-S17 of 3X.

Figure 4:
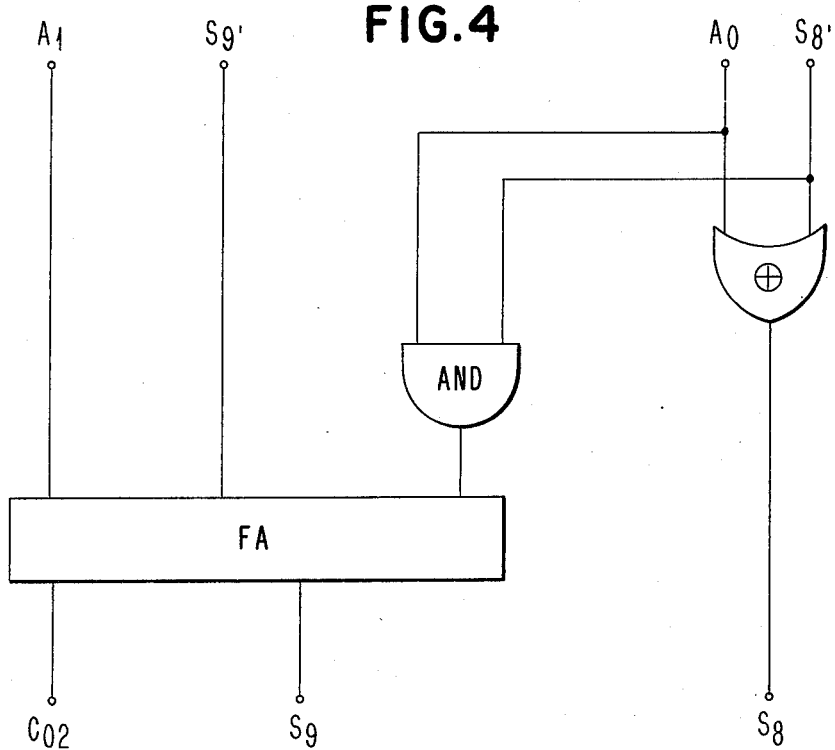
FIGS. 4 and 5 show circuits associated with the device of FIG. 3. These features show the circuitry for providing an adder that performs the operation X + 2X, the adder being divided into a number of sub-adders.
Figure 5:
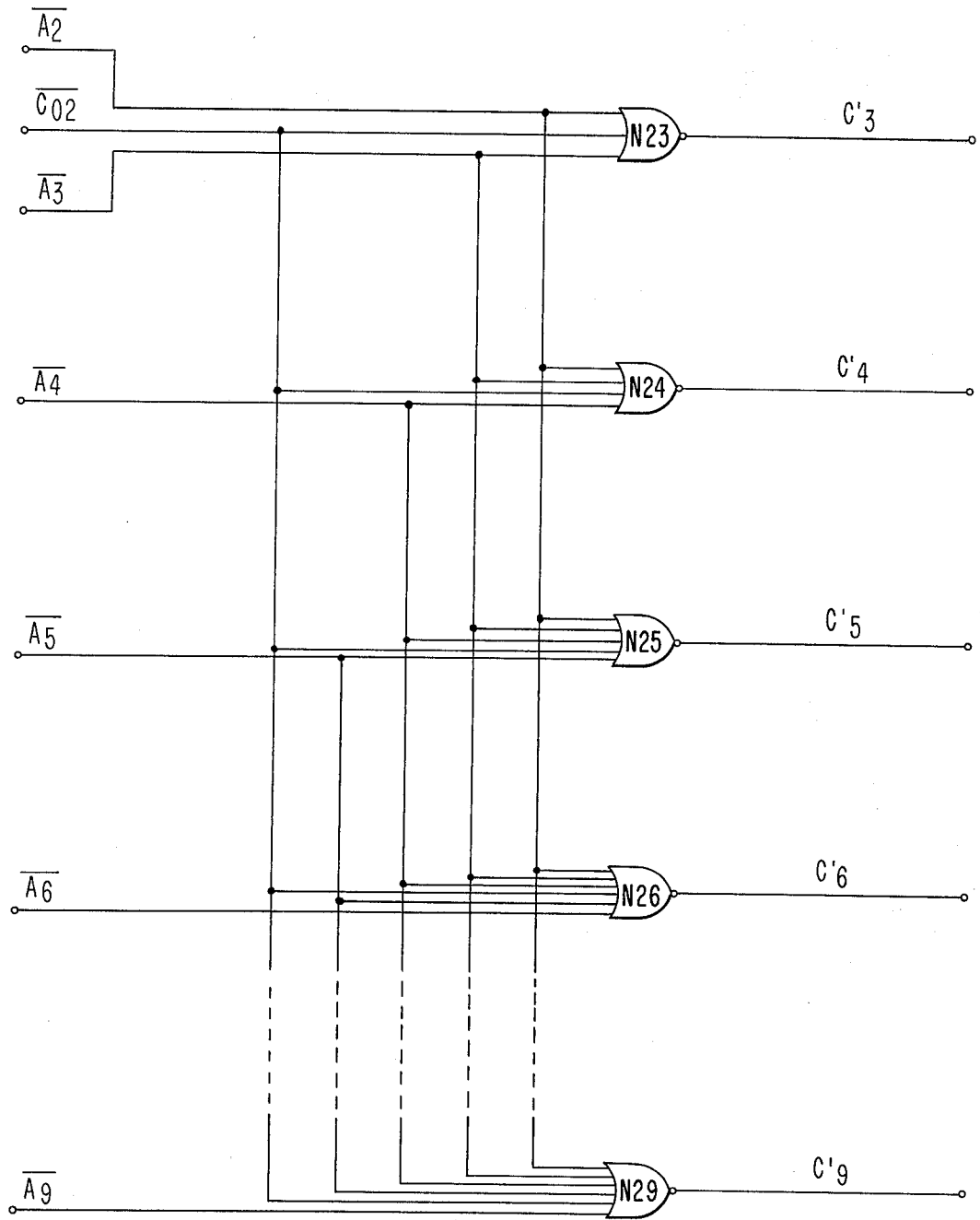

Referring now to FIG. 4, bit S8 is obtained by means of a simple Exclusive OR Invert circuit 0 which receives as inputs S8' and A0. However, the combination of these inputs will also yield a carry bit if they both have a logical 1 value. This carry bit is therefore obtained by means of an AND circuit, the output of which is fed to the carry input of a full-adder stage FA. The latter, which also receives as input S9' and A1, provides bit S9 and a carry bit C02 which must be allowed to propagate through bits A2-A9. This is done using the carry lookahead technique. A carry generator such as that shown in FIG. 5 is therefore required. This generator is comprised of seven NOR circuits designated N23-N29 which generate carry bits C'3-C'9. The bits shown in the right-hand column of the following table are applied to the respective inputs of N23-N29.

| | | | | | | | | |
|---|---|---|---|---|---|---|---|---|
| N23 | $\overline{A2}$, | $\overline{C02}$, | $\overline{A3}$ | | | | | |
| N24 | $\overline{A2}$, | $\overline{C02}$, | $\overline{A3}$, | $\overline{A4}$ | | | | |
| N25 | $\overline{A2}$, | $\overline{C02}$, | $\overline{A3}$, | $\overline{A4}$, | $\overline{A5}$ | | | |
| N26 | $\overline{A2}$, | $\overline{C02}$, | $\overline{A3}$, | $\overline{A4}$, | $\overline{A5}$, | $\overline{A6}$ | | |
| N27 | $\overline{A2}$, | $\overline{C02}$, | $\overline{A3}$, | $\overline{A4}$, | $\overline{A5}$, | $\overline{A6}$, | $\overline{A7}$ | |
| N28 | $\overline{A2}$, | $\overline{C02}$, | $\overline{A3}$, | $\overline{A4}$, | $\overline{A5}$, | $\overline{A6}$, | $\overline{A7}$, | $\overline{A8}$ |
| N29 | $\overline{A2}$, | $\overline{C02}$, | $\overline{A3}$, | $\overline{Ar}$, | $\overline{A5}$, | $\overline{A6}$, | $\overline{A7}$, | $\overline{A8}$, $\overline{A9}$ |

Bits S10-S17 are obtained by Exclusive OR'ing bits C02, C'3, C'4, . . . , C'9 and A2, A3, A4, . . . , A9, respectively. Bit S18 is obtained by AND'ing C'9 and A9.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. Apparatus for generating a three times multiple of a binary number X having orders $X_0, X_1, X_2, X_3, X_4 \ldots$ et sequence comprising, in combination, a. a multi-order sum generator which receives as one input signals representative of the orders of said X number $X_0, X_1, X_2, X_3, \ldots$ et sequence in corresponding orders of said sum generator to obtain in effect an entry of one times said X number into said sum generator;

b. circuit routing means arranged in said sum generator for inputting the signals representative of each order $X_0, X_1, X_2, X_3 \ldots$ et sequence of said X number also to the succeeding higher order of said sum generator to obtain in effect an entry of two times said X number into said sum generator;

c. a multi-order carry circuit for generating the carry bit for each stage of order $k+1$ of said sum generator by means of logic circuits providing $$C_{k+1} = X_k X_{k-1} + (X_{k-1} \cdot X_{k-2} + \ldots + X_{k-1} X_{k-3} X_{k-5} \ldots X_1) + (X_k X_{k-2} X_{k-3} + \ldots + X_k X_{k-2} X_{k-4} \ldots X_0)$$

where $k$ is any integer $n$ taking on a value from two et sequence, said orders $X_0, X_1, X_2, X_3, X_4, \ldots$ et sequence of said input number X also being applied to said carry generator, and wherein for said binary number X a carry signal bit is generated for each order starting at order three et sequence;

d. a separate carry generating means included within said sum generator and responsive also to the second order of said X value and the first order of said routed X-Valve to separately generate a carry digit for entry to the third order of said sum generator;

e. and means applying each carry signal generated by said multi-order carry circuit as an input to the related order of said sum generator, and any carry signal generated by said separate carry generator for input to said third order of the sum generator, said inputs of said one times said X-value, two times said X-value and the carry signals generating on multi-order outputs of said sum generator, a three times multiple of said binary number X.

2. Apparatus in accordance with claim 1 further characterized in that said multi-order carry circuit utilizes in part NOR logic circuitry comprising, a. a first series of NOR circuits fed by combinatorial orders of said input X-number, and
   b. a second series of NOR circuis fed by combinatorial outputs of said first series to generate carry digit outputs for input to each successive order of said sum generator starting with the possible carry generated for input to the fourth order.

3. Apparatus in accordance with claim 2 further characterized in that said first series of NOR circuits comprises individual NOR circuit elements having inputs of said order of the number X as follows:

| NOR Circuit | | | | | |
|---|---|---|---|---|---|
| N1 | Inputs of | $\overline{X0}$, | $\overline{X1}$ | | |
| N2 | | $\overline{X1}$, | $\overline{X2}$ | | |
| N3 | | $\overline{X2}$, | $\overline{X3}$ | | |
| N4 | | $\overline{X0}$, | $\overline{X1}$, | $\overline{X3}$ | |
| N5 | | $\overline{X3}$, | $\overline{X4}$ | | |
| N6 | | $\overline{X1}$, | $\overline{X2}$, | $\overline{X4}$ | |
| N7 | | $\overline{X4}$, | $\overline{X5}$ | | |
| N8 | | $\overline{X2}$, | $\overline{X3}$, | $\overline{X5}$ | |
| N9 | | $\overline{X0}$, | $\overline{X1}$, | $\overline{X3}$, | $\overline{X5}$ |
| N10 | | $\overline{X5}$, | $\overline{X6}$ | | |
| N11 | | $\overline{X3}$, | $\overline{X4}$, | $\overline{X6}$ | |
| N12 | | $\overline{X1}$, | $\overline{X2}$, | $\overline{X4}$, | $\overline{X6}$ |
| N13 | | $\overline{X6}$, | $\overline{X7}$ | | |
| N14 | | $\overline{X4}$, | $\overline{X5}$, | $\overline{X7}$ | |
| N15 | | $\overline{X2}$, | $\overline{X3}$, | $\overline{X6}$, | $\overline{X7}$ |
| N16 | | $\overline{X0}$, | $\overline{X1}$, | $\overline{X3}$, | $\overline{X5}$, $\overline{X7}$ | and similarly to a number of NOR circuits equal to twice the number of finite orders of said sum generator and said second series of NOR circuits comprising individual NOR circuit elements having inputs from the outputs of NOR elements of said first series as follows:

N1, N2 outputs inputted to a NOR circuit 1' to generate the carry digit C3 for input to the 4th order of said sum generator, N2, N3, N4 outputs inputted to NOR circuit 2' to generate carry digit C4 for input to the 5th order of said sum generator, N3, N4, N5, N6 outputs inputted to NOR circuit 3' to generate the carry digit C5 for input to the 6th order of said sum generator, and so forth for a number of NOR circuits of said second series to generate a final carry sign digit corresponding to the X-factors entered into the highest finite order of said sum generator.

* * * * *